United States Patent [19]
Englert

[11] 3,746,144
[45] July 17, 1973

[54] ADJUSTABLE CONVEYOR BRACKET ASSEMBLY

[76] Inventor: Merton L. Englert, 4671 S. 88th East Avenue, Tulsa, Okla. 74145

[22] Filed: Jan. 6, 1972

[21] Appl. No.: 215,797

[52] U.S. Cl. .................................... 198/91, 198/99
[51] Int. Cl. .......................................... B65g 37/00
[58] Field of Search ...................... 198/93, 99, 121, 198/122, 233, 204, 91, 94, 119; 248/291, 294, 292, 293; 300/2, 14

[56] References Cited
UNITED STATES PATENTS
923,064    5/1909   Morenus .............................. 198/99
3,182,784  5/1965   Coy ..................................... 198/99

*Primary Examiner*—Edward A. Sroka
*Attorney*—Harvey B. Jacobson

[57] ABSTRACT

An adjustable bracket assembly for connecting a pair of commonly driven conveyors, said bracket assembly comprising two pairs of brackets connected to the ends of the conveyors and adjustably fastened together by connection holes circumferentially spaced about the axis of a shaft rotation in one pair of brackets and correspondingly arcuately spaced connection apertures in the other pair of brackets, such that the distance between the shafts remains constant regardless of the angle between the conveyors.

7 Claims, 4 Drawing Figures

Patented July 17, 1973　　　　　　　　3,746,144

Patented July 17, 1973  3,746,144

ADJUSTABLE CONVEYOR BRACKET ASSEMBLY

The present invention is generally related to conveyor assemblies and, more particularly, to a versatile bracket construction for interconnecting adjacent conveyors to permit convenient angular adjustment therebetween.

It has become common practice to utilize several conveyors connected together in series to perform different functions or to change the direction of material flow. Many such arrangements incorporate a "feeder conveyor" which feeds the conveyed material to an inclined main conveyor. Since most feeder conveyors are relatively short in length and present relatively light loads, it is advantageous to drive such from the main conveyor by way of a chain and sprocket, gears, or the like. This is substantially less expensive than providing a separate feeder conveyor drive and also assures proper synchronization between the conveyors.

It is often necessary in such installations to change the angular relation between the feeder and main conveyors. Such changes in the past, however, have required replacement or modificaton of the roller chains, gears, or bracket assemblies due to the changes in spacing between the adjacent conveyor shafts. Therefore, it is an object of the present invention to provide a novel bracket assembly for interconnecting adjacent conveyors to permit convenient angular adjustment therebetween without replacing the roller chain or other members drivingly connecting the conveyors, thereby resulting in a substantial cost savings when making such adjustments.

Another object of the present invention is to provide a unique adjustable bracket assembly including a pair of brackets having a plurality of connection holes which are circumferentially spaced about the axis of rotation of one of the conveyor shafts, whereby the radial spacing between the shafts of the interconnected conveyors remains constant regardless of the angle between the conveyors.

It is a further object of the present invention to provide a versatile angularly adjustable bracket assembly for conveyors which is relatively simple in construction, rugged, durable, long-lasting, and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
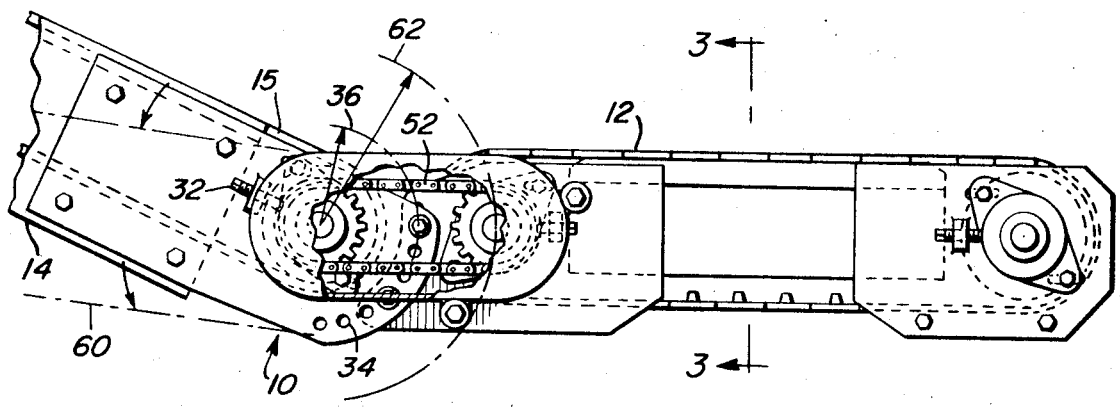
FIG. 1 is a side elevation, with sections removed, of the adjustable bracket assembly of the present invention interconnecting typical feeder and main conveyors.
Figure 2:
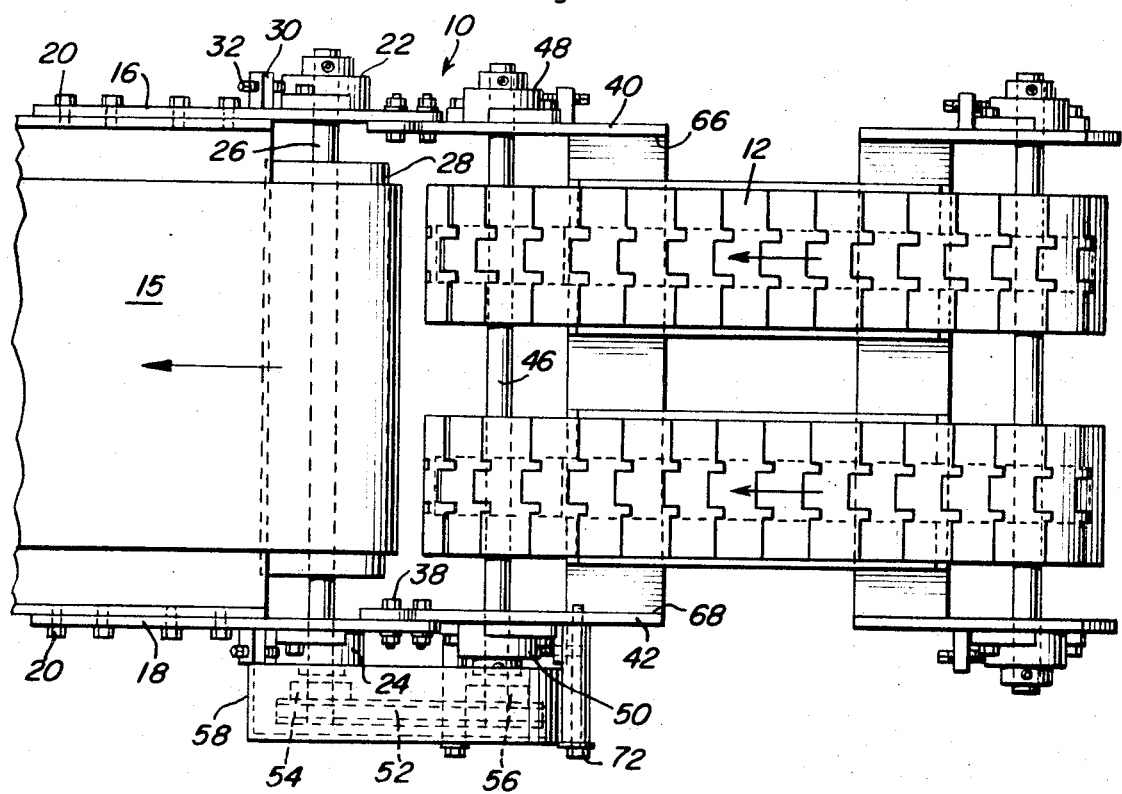
FIG. 2 is a plan view of the adjustable bracket assembly and conveyors illustrated in FIG. 1.
Figure 3:
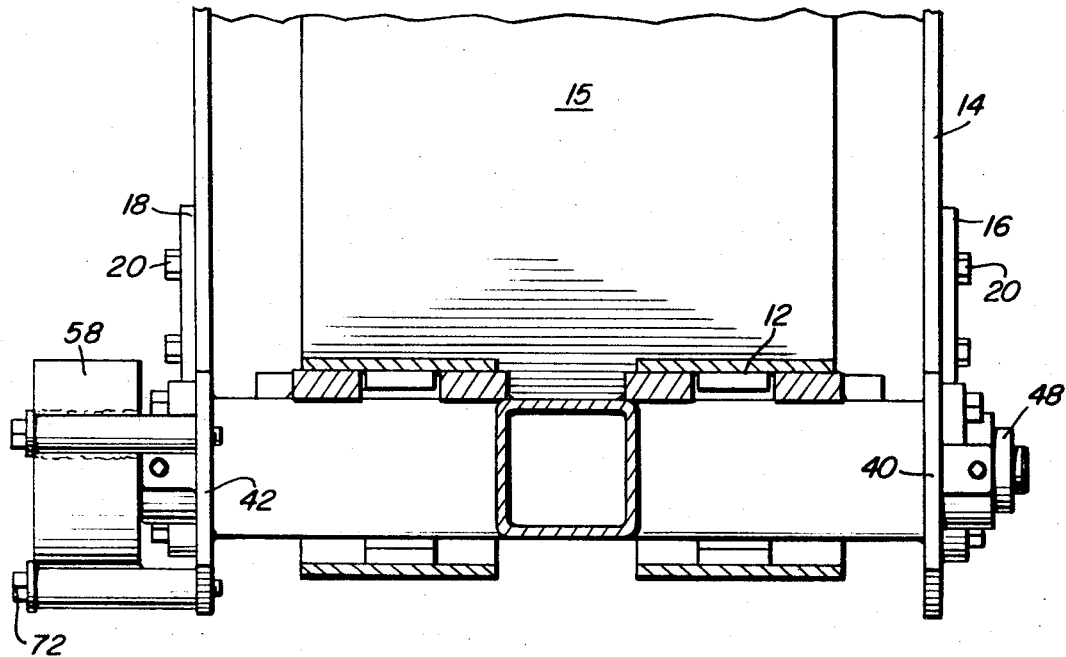
FIG. 3 is a sectional view taken along section 3—3 of FIG. 1.

Referring now more particularly to the drawings, the adjustable bracket assembly of the present invention is generally indicated by the numeral 10 and is illustrated in FIGS. 1-3 as interconnecting a feeder conveyor 12 with an inclined main conveyor 14. The bracket assembly includes a first pair of oppositely disposed rigid brackets 16 and 18 which are attached to one end of the main conveyor by way of bolts 20, or similar fastening means. Preferably, each bracket is made of steel or similar material and is generally flat in configuration. The outer end portion of each bracket is provided with means for supporting a pair of shaft bearings indicated at 22 and 24. An elongated shaft 26 extends between brackets 16 and 18 and is rotatably supported by bearings 22 and 24 for rotation with a drive roll 28, or similar rotating conveyor member, to advance conveyor belt 15 in a conventional manner.

Each of the brackets may be provided with a bearing adjustment block 30 with internal threads receiving an adjustment bolt 32 which engages the associated bearing. Brackets 16 and 18 are further provided with a plurality of connection holes 34 which are circumferentially spaced about the axis of shaft 26 as indicated by circle 36 in FIG. 1. The connection holes 34 are adapted to receive bolts 38, or similar fastening means, which connect brackets 16 and 18 with a second pair of brackets 40 and 42 associated with the feeder conveyor. The outer ends of brackets 40 and 42 are provided with a plurality of connection apertures 44 which are arcuately spaced in a circular path of radius equal to that of circle 36. As such, the connection holes 34 and connection apertures 44 generally overlie each other to permit the passage of bolts 38.

The feeder conveyor is provided with a drive shaft 46 rotatably supported by bearings 48 and 50 in a manner similar to shaft 26. A roller chain 52, or similar power transmission means, interconnects shaft 26 and 46 by way of sprockets 54 and 56 keyed to the shafts. A hood 58 may be mounted to the bracket to provide a protective cover for the chain and sprocket mechanism.

It will be appreciated that the angular position of conveyor 14 may be adjusted with respect to feeder conveyor 12 due to the arrangement of the connection holes and apertures 34 and 44. Angular adjustment of the main conveyor 14 is illustrated in FIG. 1 by rotating the main conveyor in a counter-clockwise direction, as indicated by arrows, to a position illustrated in dash lines at 60. This rotation is about shaft 26 and since the connection holes 34 lie on a circle about the shaft, the relative position of sprocket 54 with respect to sprocket 56 is unchanged, the distance between shafts 26 and 46 remaining constant as represented by circle 62.

It will be appreciated that since the spacing between the shafts remains constant regardless of the angular position of conveyor 14, it is not necessary to modify or replace roller chain 52. Of course, other power transmission means, such as gears, or belt and sheave drives, may be utilized as well, the constant spacing between shafts making it unnecessary to modify or replace such components. It will also be appreciated that the adjustable bracket assembly of the present invention is not limited to adjustment of the main conveyor alone, but may be utilized for adjusting the feeder conveyor inclination as well. Also, it is not intended that the bracket assembly of the present invention be limited to use with the types of conveyors illustrated in the drawings. While main conveyor 14 is illustrated as a belt-type and feeder conveyor 12 is shown as a chain type, other types of conveyors which are well known may be utilized, if desired.

Figure 4:
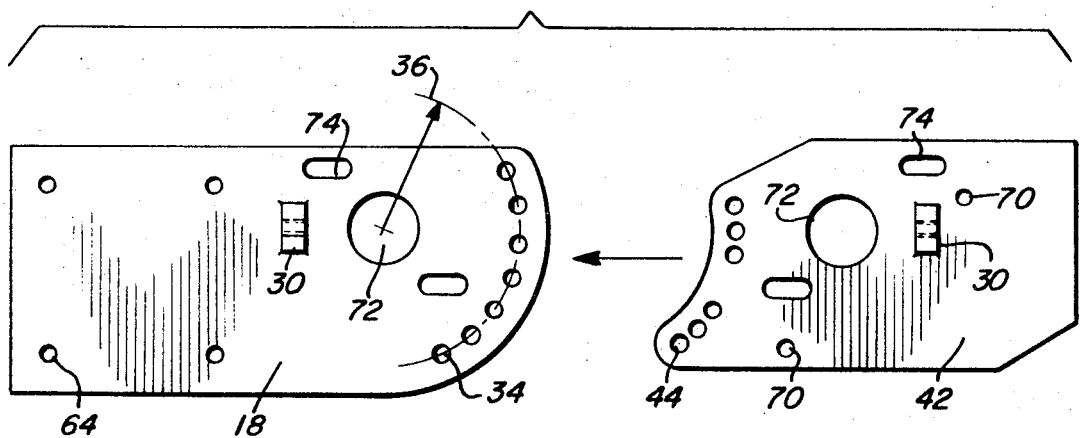
FIG. 4 is an exploded elevational view of a pair of brackets associated with the assembly of the present invention.

Referring to FIG. 4, the structural details of each bracket may be more clearly seen. Preferably, brackets 16 and 18 are provided with four mounting holes 64 which are adapted to receive bolts 20 for fastening to the main conveyor framework. Brackets 40 and 42 may be welded to the feeder conveyor framework as indicated at 66 and 68, or other fastening means may be utilized, if desired. Bracket 42 is provided with a pair of threaded support holes 70 which receive bolts 72 for mounting hood 58 in position. Each bracket includes a relatively large shaft bearing hole 72 and a pair of elongated bearing mounting holes 74 which permit adjustment of each bearing by way of associated adjustment blocks 30.

It will be appreciated that the brackets are not limited to the configurations illustrated in the drawings and may be appropriately modified to accommodate the conveyors being utilized. The exact number and location of the connection holes and apertures may be varied as required so long as the circumferentially spaced relationship about one axis of rotation is maintained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with first and second conveyors having their ends adjacent to each other and being interconnected to be driven together through respective rotating members, a first pair of rigid brackets connected to the end of said first conveyor adjacent to its rotating member, each of said first pair of brackets including a plurality of connection holes circumferentially spaced about the axis of rotation of said first rotating member at a predetermined radius, and a second pair of rigid brackets attached to the end of said second conveyor adjacent to its rotating member, each of said second pair of brackets including fastening means connected to at least one of said plurality of circumferentially spaced connection holes, said fastening means being selectively releasable with respect to said circumferentially spaced connection holes to determine the angular relationship between said first and second conveyors and maintain constant radial spacing between the axes of said first and second rotating members, said fastening means including a group of connection apertures arcuately spaced about said axis of rotation of said first rotating member and generally overlapping said circumferentially spaced connection holes.

2. The structure set forth in claim 1, wherein said first and second pairs of brackets have substantially flat surfaces abutting each other in the areas of said connection holes and apertures.

3. An adjustable bracket assembly for connection of adjacent conveyors, said assembly comprising a first pair of rigid brackets adapted to be attached to the end of a first conveyor having a first rotating drive member, each of said first pair of brackets including a plurality of connection holes circumferentially spaced at a predetermined radius about a point alignable with the axis of rotation of the first rotating drive member, and a second pair of rigid brackets adapted to be attached to the end of a second conveyor having a second rotating drive member, each of said second pair of brackets including a group of connection apertures spaced about an arc having a radius equal to said predetermined radius, said connection holes being alignable with said connection apertures for angular adjustment between the first and second conveyors while maintaining constant spacing between the first and second rotating drive members.

4. The structure set forth in claim 3 wherein said brackets include means for rotatably supporting the first and second rotating drive members.

5. The structure set forth in claim 3, wherein the surface areas around said connection holes and apertures overlap each other.

6. The structure set forth in claim 5, wherein said brackets are each substantially flat in the surface areas around said connection holes and apertures.

7. The structure set forth in claim 6, wherein said bracket assembly includes means extending between said connection holes and apertures to fasten the associated brackets together.

* * * * *